United States Patent
Whitefield et al.

(10) Patent No.: US 7,062,415 B2
(45) Date of Patent: Jun. 13, 2006

(54) PARAMETRIC OUTLIER DETECTION

(75) Inventors: Bruce J. Whitefield, Camas, WA (US); David A. Abercrombie, Gresham, OR (US); David R. Turner, Albuquerque, NM (US); James N. McNames, Portland, OR (US)

(73) Assignee: LSI Logic Corporation, Milpitas, CA (US)

( * ) Notice: Subject to any disclaimer, the term of this patent is extended or adjusted under 35 U.S.C. 154(b) by 7 days.

(21) Appl. No.: 10/928,292

(22) Filed: Aug. 27, 2004

(65) Prior Publication Data

US 2006/0047485 A1 Mar. 2, 2006

(51) Int. Cl.
*G06F 17/00* (2006.01)

(52) U.S. Cl. .................. 702/194; 702/179; 702/35; 703/2

(58) Field of Classification Search ........... 702/194, 702/35, 36, 58, 59, 118, 179, 196, 189; 703/13, 703/14, 2
See application file for complete search history.

(56) References Cited

U.S. PATENT DOCUMENTS

| 6,424,929 B1* | 7/2002 | Dawes ............... 702/179 |
| 2003/0144810 A1* | 7/2003 | Tabor ............... 702/108 |
| 2004/0039548 A1* | 2/2004 | Selby et al. ........ 702/179 |
| 2004/0138846 A1* | 7/2004 | Buxton et al. ...... 702/108 |
| 2004/0267477 A1* | 12/2004 | Scott et al. ....... 702/108 |

\* cited by examiner

*Primary Examiner*—Hal Wachsman
(74) *Attorney, Agent, or Firm*—Luedeka, Neely & Graham, P.C.

(57) ABSTRACT

A method for determining outlier data points in. A subset of dataset patterns is selected from a set of mathematical dataset patterns, and the subset of dataset patterns is combined into a composite dataset. The composite dataset is compared to the dataset, and a degree of correlation between the composite dataset and the dataset is determined. Data points within the composite dataset are selectively weighted to improve the degree of correlation, and the steps described above are selectively iteratively repeated until the degree of correlation is at least a desired value. Residuals for the data points within the composite dataset are selectively determined. At least one of the weighted data points within the composite dataset that are weighted within a first specified range, and data points within the composite dataset that have a residual within a second specified range, are selectively output as outlier data points.

20 Claims, 4 Drawing Sheets

PARAMETRIC OUTLIER DETECTION

FIELD

This invention relates to the field of substrate processing. More particularly, this invention relates to detecting outlying points in data such as yield and parametrics, to identify and correct substrate processing problems.

BACKGROUND

Modern integrated circuits are extremely complex devices that are fabricated using equally complex processes. As the term is used herein, "integrated circuit" includes devices such as those formed on monolithic semiconducting substrates, such as those formed of group IV materials like silicon or germanium, or group III–V compounds like gallium arsenide, or mixtures of such materials. The term includes all types of devices formed, such as memory and logic, and all designs of such devices, such as MOS and bipolar. The term also comprehends applications such as flat panel displays, solar cells, and charge coupled devices. Because of the complexity of integrated circuits and the processes by which they are formed, it can be extremely difficult to determine the reasons why some devices function properly and other devices function improperly, or fail altogether.

Integrated circuits are typically manufactured on thin silicon substrates, commonly referred to as wafers. The wafer is divided up onto smaller rectangular sections for each device, typically known as the die or device. The methods and other embodiments according to the present invention can be applied to processes that are performed on other substrates to make other devices or components, such as flat panel display manufacturing, which is performed on rectangular glass substrates. Thus, this disclosure generally refers to substrates, substrate profiles, and substrate contact points, even though silicon wafer processing may be the most common application for the embodiments of the invention. It is appreciated that the same or similar methods are just as applicable to the analysis of a wide variety of substrates. Wafer test yield of die, or simply yield, is predominantly used as an example herein of an important dependent variable of interest. However, it is appreciated that any other dependent variable that is spatially associated with the substrate can also be used.

One method to assist in failure analysis is mapping important variables, such as yield, according to the position at which the variable is read on the substrate. Wafer mapping, for example, has traditionally been done by plotting the pass/fail data (i.e. yield) or other variable of interest versus the die position on the wafer. These wafer maps can be enhanced by combining values from many wafers in what is known as a stacked map. Recently there have been improvements in substrate mapping that can combine data from many wafers and many devices into what is known as a high-resolution wafer profile. Such substrate profiles are created from databases of information that is associated with substrates. A graphical representation is developed from the information, which representation depicts the yield or other variable read from the devices on the substrate, according to their position on the substrate. Substrate profiles such as these look somewhat like a topographical map, where the various contours of the profile delineate areas of different average (or otherwise computed) yield or other measured variable of interest for the devices bounded by those contours on the substrates.

Testing of yields and parametric measurement parameters on substrates has at least two purposes. One is to characterize the systematic patterns of variation across the substrate, and another is to detect outliers in these patterns that may suggest a defect of potential harm to the reliability of the die. Many techniques have been proposed to detect outliers in production test data, but Nearest Neighbor Residual has been implemented in production to detect outliers in reference to the systematic variability of data values across a substrate. Nearest Neighbor Residual uses the data from the surrounding measurements to predict whether the measurement in question is an outlier to its neighbors. The premise is that the typical value of the neighbors represents the background value of the systematic variability on that portion of the substrate.

Typical methods to identify outlier data point in substrate parametric data include simple statistics of the entire population to set a limit, and Nearest Neighbor Residual that compares a point to the median of its nearest neighbor points. Unfortunately, simple statistics on the entire population are heavily influenced by wide variations in the data, such as may be caused by the systematic variance components across the substrate. For example, a given point might be an outlier in its neighborhood, but might very nearly be an average value for the substrate, because of the wide variation of the data across the substrate. Thus, simple statistics might indicate that the point is okay, when in reality it represents an abnormality within its region of the substrate.

On the other hand, Nearest Neighbor Residual can be very limited when the nearest neighbor locations are missing or otherwise not available, such as because they are beyond the edge of the substrate. Without enough data to make a good assumption of the expected value of the region, it is difficult for Nearest Neighbor Residual to evaluate whether the point in question is an outlier.

What is needed, therefore, is a system for determining outliers that reduces some of the problems mentioned above.

SUMMARY

The above and other needs are met by a method, as depicted by flowchart 10 in FIG. 7, for determining outlier data points in an ordered dataset of values. a) A subset of dataset patterns is selected from a set of mathematical dataset patterns, as given in block 12 and b) the subset of dataset patterns is combined into a composite dataset, as given in block 14. c) The composite dataset is compared to the ordered dataset of values, as given in block 16 and d) a degree of correlation between the composite dataset and the ordered dataset of values is determined, as given in block 18. e) Data points within the composite dataset are selectively weighted to improve the degree of correlation, as given in block 20 and f) steps a through e are selectively iteratively repeated until the degree of correlation is at least a desired value, as given in block 22. g) Residuals for the data points within the composite dataset are selectively determined, as given in block 24. h) At least one of (1) the weighted data points within the composite dataset that are weighted within a first specified range, and (2) data points within the composite dataset that have a residual within a second specified range, are selectively output as outlier data points, as given in block 26. The outlier data points are preferably then analyzed for possible process anomalies, as given in block 28.

In this manner, the system according to the present invention provides a way to preferably use all of the data in the dataset, such as on the substrate, to better predict the background variance components from which outliers can be detected. This system uses iteratively re-weighting of residuals to preferably reduce the influence of outliers on the systematic model fit. In the iterative process, the residual weighting values are successively lowered for data points that are outside the systematic variation, thus limiting their impact.

Thus, the present system uses the residuals or their weighting factors to identify which values are outliers from the smooth variation components that effect the value of different measurements across the substrate. In the weighting factor data, small values represent the outliers. In the residuals data, large values represent the outliers. By setting a limit on either or both of the weighting data or the residuals data, the outliers are more readily identified. This method preferably contrasts the outliers from the model prediction of the smooth underlying variation within a neighborhood. However, this method is not hampered by a lack of data points immediately surrounding the data point under evaluation, as is Nearest Neighbor Residual. Thus, this modeled approach tends to better predict the expected values at the edge of the substrate than does Nearest Neighbor Residual, which has a limited number of neighbors to use at the edge of the substrate.

In various embodiments, the datasets are presented as substrate maps. The ordered dataset of values are preferably measured values from a substrate, such as parametric data from integrated circuits on a wafer. The set of mathematical dataset patterns preferably includes at least one of cross-exposure field, radial dependency, donut, edge ring, center spot, right to left gradient, top to bottom gradient, angled top to bottom gradient, and angled bottom to top gradient. The mathematical descriptions of the dataset patterns preferably include at least one of cross exposure or reticle field, constant value, planar, quadratic, cubic, quartic, quintic, sextic, septic, octic, and higher-order polynomials, third order radial, fourth order radial, fifth order radial, and higher-order radial.

The comparison between the composite dataset and the ordered dataset is in some embodiments a manual visual comparison, but is most preferably an automated mathematical comparison, such as an automated mathematical comparison. The ordered dataset is, in various embodiments, gathered from at least one of a flat panel display, a solar cell array, and a charge coupled device array. Preferably, the ordered dataset includes x-y coordinates of values on a substrate. The outlier data points are preferably identified as either the weighted data points within the composite dataset that are given a weight that is less than a specified value, or the data points within the composite dataset that have a residual that is greater than a specified value. In some embodiments the data points within the composite dataset are selectively weighted, such as with a Huber weighting function. Preferably, an Iterative Reweighted Least Squares method is performed until the degree of correlation is at least a desired value.

According to another aspect of the invention there is described a method of determining outlier data points in an ordered set of data points. Data trends within the ordered set of data points are mathematically modeled and combined in a composite dataset. Residual values between the composite dataset and the ordered set of data points are computed, and those data points in the ordered set of data points having a residual value greater than a desired maximum residual value are flagged as outlier data points. Preferably, the datasets are measured values from a substrate presented as substrate maps. The ordered set of data points is preferably gathered from at least one of integrated circuits from a wafer, a flat panel display, a solar cell array, and a charge coupled device array.

According to yet another aspect of the invention there is described a method of determining outlier data points in an ordered set of data points. Data trends within the ordered set of data points are mathematically modeled and combined in a composite dataset. A weighting of data points within the composite dataset is adjusted until the composite dataset and the ordered set of data points have at least a desired degree of correlation. Those data points in the composite dataset having a weighting that is adjusted more than a desired maximum amount are flagged as outlier data points. Preferably, the datasets are measured values from a substrate presented as substrate maps. The ordered is set of data points is preferably gathered from at least one of integrated circuits from a wafer, a flat panel display, a solar cell array, and a charge coupled device array.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Further advantages of the invention are apparent by reference to the detailed description when considered in conjunction with the Figs., which are not to scale so as to more clearly show the details, wherein like reference numbers indicate like elements throughout the several views, and wherein.

DETAILED DESCRIPTION

Figure 1:
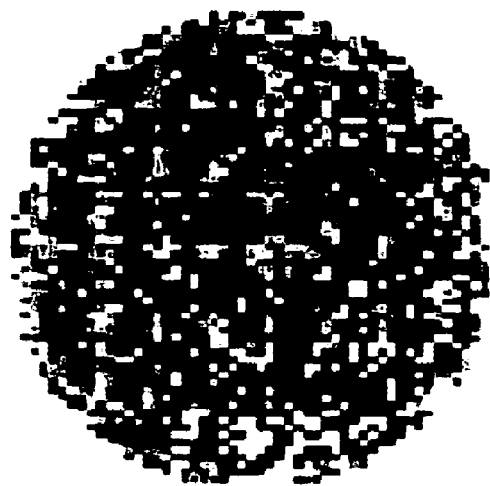
FIG. 1 depicts a substrate map of raw data.

The preferred methods according to the present invention identify outlier data points in an ordered set of data points, such as would be found for readings taken in various known positions across the surface of a substrate. The outlier data points are defined as those having values that are outside of an expected range of values, given the various trends of data values across the surface of the substrate. Thus, if the measurements are generally increasing or decreasing across the surface of the substrate according to a relatively smooth or known pattern, then values that fit within the general trends of those patterns are not considered to be outliers according to the present invention.

One complication is that a given ordered set of data may have several data trends within it, or in other words, may be comprised of several different data patterns that are interacting with each other across the surface of the substrate, either in whole or in part. Thus, according to the methods described herein, these data patterns are preferably identified as to their properties, such as shape, location, orientation, and data trend. The term "data trend" is intended to indicate how the values of the measurements within the pattern are changing, such as whether they are generally increasing from left to right, or from the center of the shape to the periphery of the shape, or whether they are generally higher or lower as group as compared to other portions of the dataset.

By identifying these patterns and the trends of the data within them, the interactions of the patterns can also be determined. Thus, a mathematical model of measurement patterns on the substrate can be constructed and compared to the actual measurements on the substrate. The mathematical model is preferably adjusted as necessary so as to provide a desired degree of correlation between the mathematical model and the actual measurements. As a part of this process, various portions of the constructed dataset are given different relative weights in order to get the constructed dataset and the actual dataset to favorably compare. Those measurements which must be "faded" or deemphasized in order for the datasets to agree, tend to be outlier data points. Alternately, those measurements which exhibit a relatively larger degree of difference between the two datasets also tend to be outlier data points.

Thus, by mathematically reconstructing an actual measured and ordered dataset, the differences between the mathematical reconstruction and the actual dataset, or the measurements which must be specially weighted to remove the differences between the mathematical reconstruction and the actual dataset, are preferably identified as outliers. More specific examples of the method are provided below.

There are several steps in the preferred methods according to the present invention, including the major steps of: 1) collecting the data of interest, 2) selecting the desired component patterns, 3) modeling the substrate patterns, 4) calculating a limit for at least one of the weighting and residuals, and 5) binning the outlier readings. Each of these steps is described in greater detail below. It is appreciated that in many instances herein, the term "map" includes both maps and profiles as described above. It is also appreciated that the term "yield" as used herein generally includes a variety of concepts in addition to pass/fail yield, such as reliability data, inspection data, customer return data, and final test data, to name a few.

Collect the Data of Interest

The various and selectable substrate data are selected first, according to the preferred methods of the invention. The data can include all available data, or selectable subsets of data. Preferably, the data has a common value scale and is associated with location information relative to where it was collected on the substrates, such as with x-y coordinates. In a most preferred embodiment, the data is selected from a database of substrate yield data, such as an engineering database. A wide variety of data can be selected for this purpose, including without reservation information such as pas/fail yield, layer thickness, and leakage current.

A die size or site scale is preferably defined, and the data is preferably normalized to that location scale. The scale used is most preferably the die size itself, and if the data collected is for every die on the substrate, then this step is accomplished inherently. The data values may, in some embodiments, be a simple 0 to 1 scale, although any scale system can be used. When combining measurements from substrates with different die sizes or data that is not mapped to die sites, such as bare substrate measurements, then the combining and normalizing steps are not inherently performed within the dataset itself, but are preferably affirmatively performed on the dataset.

A substrate map of the raw dataset is preferably generated. FIG. 1 depicts an example of a substrate map created from Iddq data, where the x-y scale is the same as the die size on the substrate. Most preferably the map is presented with a color scale for quick and easy interpretation of the map.

Select the Component Patterns

The component patterns of interest for analysis are preferably selected. In substrate processing, there are typically only a relatively few component patterns that are of interest, which situation is usually due to the nature of how substrates are processed. However, this phenomena can be advantageously used to limit the number of component pattern types that are considered by the model according to the present invention. The list of the more common patterns is given below:

a. Cross exposure field (reticle) variation (This causes stripes or checkerboard variation depending on the number of die per exposure field, commonly known as a reticle),
b. Radial dependency,
c. Donut,
d. Edge ring,
e. Center spot,
f. Cross substrate variation right to left,
g. Cross substrate variation top to bottom,
h. Cross substrate variation at a 45 deg bottom to top, and
i. Cross substrate variation at a 45 deg top to bottom.

For each component pattern of interest, a mathematical formula is preferably used in the model calculation. The function that is used for each pattern of interest is preferably previously established in the data system, based on an experimental analysis of what function works best to simulate the pattern of interest. In this manner, the user need only select the pattern they are interested in modeling. In some embodiments, multiple calculation methods are available. In the example as given herein, a total of three patterns of interest and corresponding model functions are selected for analysis, including cross exposure field, radial, and donut.

The coefficients for all of the components are preferably calculated in the same manner. Essentially, a mathematical model is created that describes the systematic variation. The model contains parameters that are preferably estimated from the data. These parameters are estimated to reduce and preferably minimize some measure of difference between the model and the actual data.

The preferred methods of constructing the mathematical models of the patterns are now explained in greater detail.

Generating Reticle Component

The statistical model for the reticle component can be expressed as follows:

$$Z_{reticle} = \sum_{i=1}^{n} r_i I_i(x, y) + \varepsilon \qquad (1)$$

where n is the number of dies in the reticle, $\varepsilon$ is a random variable that represents the random variation, $r_i$ is coefficient for reticle component, and $I_i(x,y)$ is an indicator function that is one when (x,y) is in the $i^{th}$ reticle position and zero otherwise. In general, the reticle indicator $I_i(x,y)$ is the function of die location x and y, and can be expressed as a matrix of the form:

$$I = \begin{bmatrix} 1 & 0 & 0 & 0 & 0 & 0 & 0 & 0 & 0 & 0 & 0 & 0 \\ 0 & 0 & 0 & 0 & 0 & 0 & 1 & 0 & 0 & 0 & 0 & 0 \\ 0 & 0 & 1 & 0 & 0 & 0 & 0 & 0 & 0 & 0 & 0 & 0 \\ 0 & 0 & 0 & 0 & 0 & 1 & 0 & 0 & 0 & 0 & 0 & 0 \\ 0 & 0 & 0 & 0 & 0 & 0 & 0 & 0 & 1 & 0 & 0 & 0 \\ 0 & 0 & 0 & 0 & 0 & 0 & 0 & 0 & 0 & 0 & 0 & 1 \\ 0 & 1 & 0 & 0 & 0 & 0 & 0 & 0 & 0 & 0 & 0 & 0 \\ 0 & 0 & 0 & 0 & 1 & 0 & 0 & 0 & 0 & 0 & 0 & 0 \\ \vdots & \vdots & \vdots & \vdots & \vdots & \vdots & \vdots & \vdots & \vdots & \vdots & \vdots & \vdots \\ 0 & 0 & 0 & 0 & 0 & 0 & 0 & 0 & 1 & 0 & 0 & 0 \end{bmatrix}$$

The number of columns is represents the number of die in a reticle and the number of rows is equal to the number of sites where measurements are taken. For example, if a substrate includes 500 patterns and a reticle processes 12 patterns at a time, the reticle index can be expressed with a 500×12 dimension matrix.

This matrix has two important properties. First, each row preferably has only one column that is assigned a value of 1, because each pattern is in only one reticle position. Thus, the sum across any single row is preferably always 1. In contrast, the sum of each column preferably varies depending on how many patterns fall in each reticle position. Second, each column vector is preferably orthogonal to all of the other column vectors. Thus, the inner product of any column vector with any other column vector is preferably always zero. The significance of these properties is explained in greater detail hereafter.

Generating Polynomial Components

In practice, the systematic variation can be localized and their curvatures can be expressed as a function of the measurement site index by x and y coordinates. Each substrate processing tool is generally capable of generating uniquely localized systematic variation. Thermal gradients and Chemical Mechanical Polishing, for example, can cause variation that is well explained by a polynomial function of the x and y coordinates. Up to five or more orders of polynomial components can be used, including linear (planar), quadratic, cubic, quartic, and quintic components. The linear component is a linear combination of x and y and has no interaction term. The quadratic component has two squared terms and an interaction term. The cubic and higher order components are constructed in a similar manner as that already explained. The statistical model for each polynomial component can be expressed as:

$$Z_{polynomial} = \sum_{i=1}^{n} p_i f_i(x, y) + \varepsilon \qquad (2)$$

where n is the number of polynomial components, $\varepsilon$ is a random variable that represents the random variation, $p_i$ is coefficient vector for polynomial component, and $f_i(x,y)$ is a polynomial component function. The number of coefficients for each polynomial component is preferably exactly one more than the order of the polynomial.

Generating Radial Components

Some tools, such as those that use centripetal force to spread a thin layer of photoresist or some other chemical across a substrate, can cause radial patterns. Doughnut and Bull's-eye patterns are common examples of radial patterns. Radial components are a function of radius R and tend to vary only as a function of distance from the center of the substrate. The statistical model for the all of the radial components is preferably:

$$Z_{radial} = \sum_{i=2}^{n} d_i R^i + \varepsilon, \text{ where } R = \sqrt{x^2 + y^2} \qquad (3)$$

where n is the number of radial components, $\varepsilon$ is a random variable that represents the random variation, $d_i$ is coefficient for the ith radial component, and R is radius of the measurement site from the center of the wafer. Note that the first term included in this sum is of second order. The first order term is preferably always omitted because it causes a discontinuity at the center of the substrate that typically does not occur in practice.

Statistical Modeling

In statistical process control, point statistics such as mean and variance are typically used to quantify substrate variations. Using point statistics, a complete statistical substrate variation model can be constructed by combining the three types of systematic variation (1), (2), and (3), as given above, as:

$$Z_{Full\_Model} = \sum_{i=1}^{n} r_i I_i(x, y) + \sum_{i=1}^{n} p_i f_i(x, y) + \sum_{i=1}^{n} d_i R^i + \varepsilon \qquad (4)$$

Matrix algebra is widely used for statistical analysis, as it permits the statistical model or large array of data to be denoted compactly and operated efficiently. The model (4) is preferably expressed as a system equation, by:

$$Z = Ab + \varepsilon \qquad (5)$$

where b is a vector containing individual coefficients. A is an indicator matrix that can be constructed like the following form, $$A = \begin{bmatrix} 1 & I_{11} & I_{21} & \cdots & I_{n1} & X_1 & Y_1 & X_1^2 & X_1Y_1 & Y_1^2 & \cdots & X_1Y_1^{n-1} & Y_1^n & R_{11} & R_{21} & \cdots & R_{n1} \\ 1 & I_{12} & I_{22} & \cdots & I_{n2} & X_2 & Y_2 & X_2^2 & X_2Y_2 & Y_2^2 & \cdots & X_2Y_2^{n-1} & Y_2^n & R_{12} & R_{22} & \cdots & R_{n2} \\ 1 & I_{13} & I_{23} & \cdots & I_{n3} & X_3 & Y_3 & X_3^2 & X_3Y_3 & Y_3^2 & \cdots & X_3Y_3^{n-1} & Y_3^n & R_{13} & R_{23} & \cdots & R_{n3} \\ \vdots & \vdots & \vdots & \vdots & \vdots & \vdots & \vdots & \vdots & \vdots & \vdots & \vdots & \vdots & \vdots & \vdots & \vdots & \vdots & \vdots \\ 1 & I_{1n} & I_{2n} & \cdots & I_{nn} & X_n & Y_n & X_n^2 & X_nY_n & Y_n^2 & \cdots & X_nY_n^{n-1} & Y_n^n & R_{1n} & R_{2n} & \cdots & R_{nn} \end{bmatrix}$$

Multicollinearity

The indicator matrix A does not have full column rank. This problem, called multicollinearity, makes it difficult to estimate the model coefficients accurately, because a pattern cannot be properly detected if one component pattern is correlated to others. A specific example is the radius squared. This is equal to $R^2=x^2+y^2$, which can be represented with a quadratic polynomial. Low order components are dominant in both polynomial and radial components. In other words, as the component's order increases, high order components become difficult to estimate. Visually, the higher order radial components ($3^{rd}$, $4^{th}$, $5^{th}$, and $6^{th}$) are nearly indistinguishable.

Orthogonalization

An alternative method to overcome the multicollinearity is to use orthogonal polynomials. This is preferably achieved by a linear transformation of the data matrix A such that the columns of the new matrix are orthonormal. If all components are centered (by subtracting their means) and orthogonalized, all the components are uncorrelated. There is a useful matrix factorization, called QR decomposition, which provides this transformation, as given by:

$$A=Q \cdot R \quad (6)$$

$$Q^T \cdot Q=1 \quad (7)$$

Here R is an upper triangular matrix and Q is an orthogonal matrix, where each column vector of Q is an orthonormal basis vector. Although the decomposition exists for a general rectangular matrix, the present method is preferably restricted to cases in which the matrix is square or has more rows than columns, indicating that the number of sample locations is greater than the number of the coefficients. Like other matrix factorizations, such as singular value decomposition, QR decomposition can be used to solve systems equations.

After orthogonalization, the high order polynomial and radial components show distinct patterns. However, multicollinearity continues to cause problems. The left and right edges of the reticle component are still corrupted as are the 2nd and 4th order radial components. This occurs because the constant component is collinear with the reticle components, recalling that each row of the reticle indicator variables sum to 1—the same as a constant component. Similarly, the 2nd and 4th order radial components are collinear with the 2nd and 4th order polynomials. The reason why the $6^{th}$ radial component shows a distinct pattern is that the model does not contain the same order ($6^{th}$) polynomial component. When these redundant components are eliminated, these problems disappear due to multicollinearity.

Figure 5:
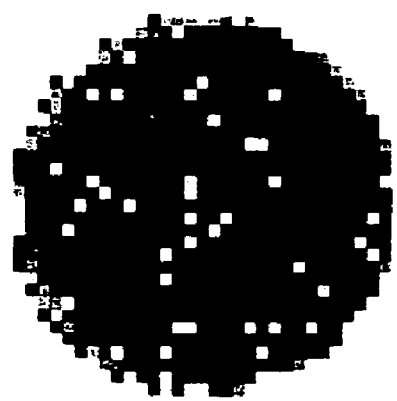
FIG. 5 depicts a combination of weighted patterns of FIGS. 3 and 4, which is the final model of the raw data depicted in the substrate map of FIG. 1.
Figure 6:
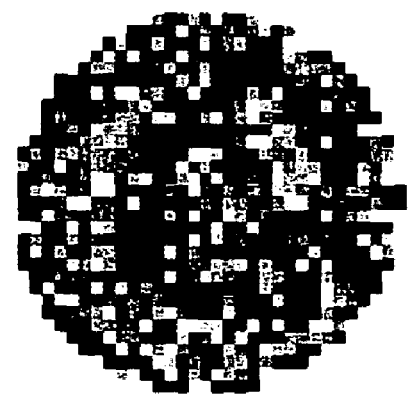
FIG. 6 depicts a graphical representation of the degree of correlation between the modeled substrate pattern of FIG. 5 and the raw data substrate pattern of FIG. 1.
Figure 7:
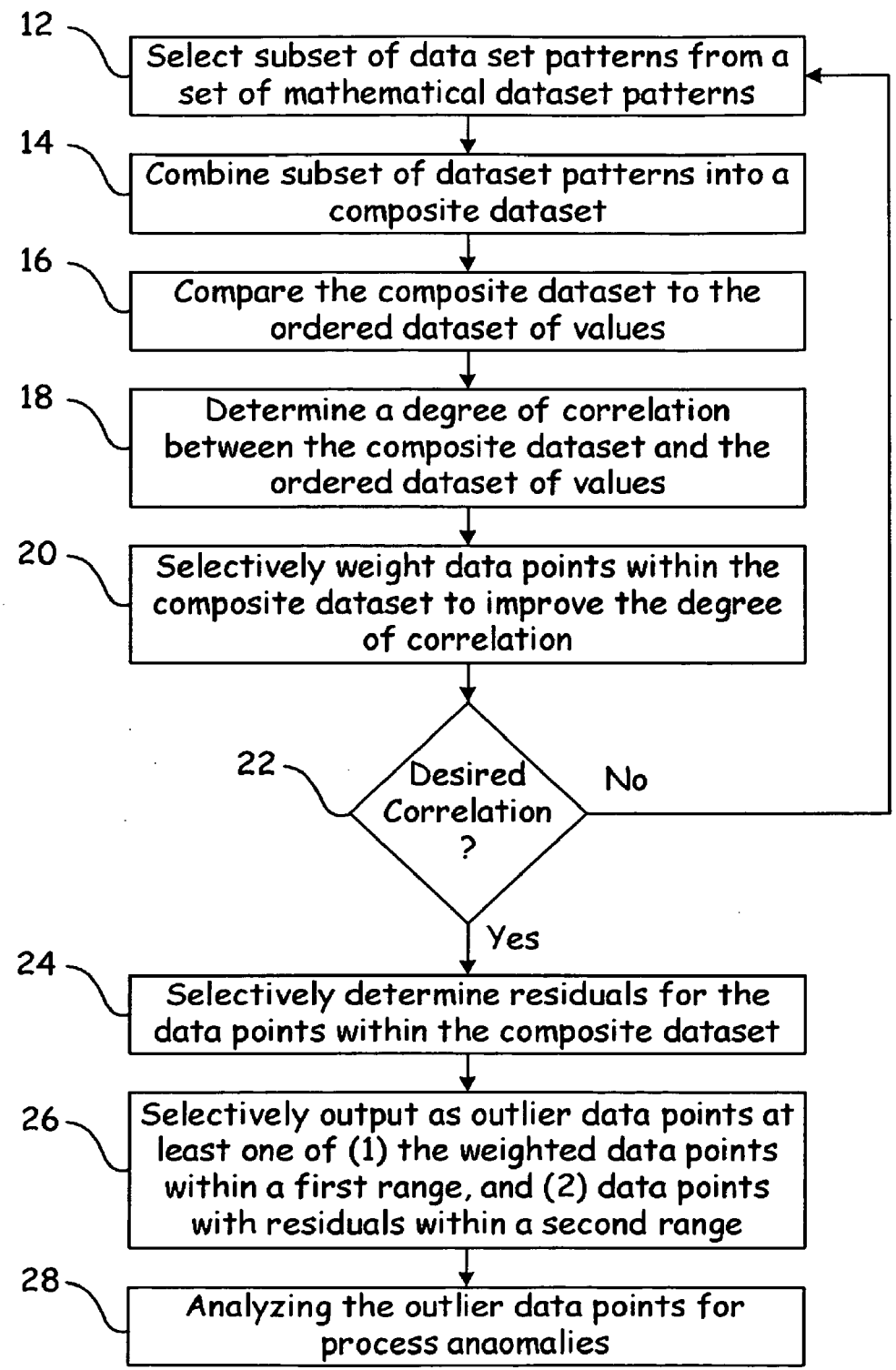
FIG. 7 depicts a flowchart of a method according to the present invention.

The radial and donut patterns are depicted in FIG. 5, such as with contour lines. However, it is appreciated that in most embodiments the actual map would not be in a profile form, but would be in a non-smoothed map format. The profile depiction of FIG. 5 is presented for clarity, given the limitation of the drawn figures. The reticle variation pattern is depicted in FIG. 6. Again, it is appreciated that in actual implementation, the resolution of the substrate map would tend to be higher, and have a greater number of gradations that are presented in FIG. 6, which is made for the purposed of a representative example only.

Model the Substrate Patterns

Utilizing a weighting function, the original pattern is preferably modeled using the component functions as selected. In this example, a Huber weighting function and Iterative Reweighted Least Squares method is preferably employed. It is appreciated that other weighting functions and methods can be used, as desired or appropriate. The Huber weighting function is preferably used to reduce the impact of outlier data points on the model. The Iterative Reweighted Least Squares method is preferably used to achieve a good convergence of the model with the raw pattern. The Iterative Reweighted Least Squares method has been found to work well on substrate based data, although other methods could also be used. An ordinary least squares method is preferably employed when the data does not contain outliers.

Figure 3:
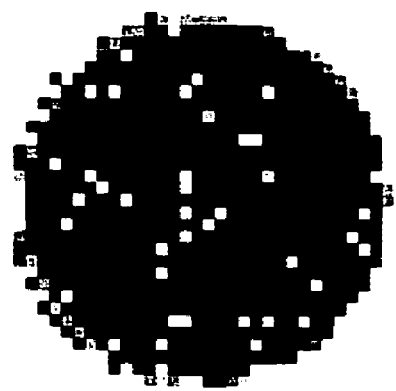
FIG. 3 depicts a combined polynomial substrate model pattern and radial substrate model pattern.
Figure 4:
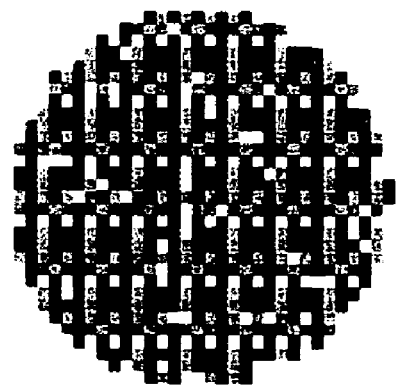
FIG. 4 depicts a reticle or striped substrate model pattern.

The radial and donut patterns are depicted in FIG. 3, and the reticle variation pattern is depicted in FIG. 4.

Model the Substrate Patterns

Utilizing a weighting function, the original pattern is preferably modeled using the component functions as selected. In this example, a Huber weighting function and Iterative Reweighted Least Squares method is preferably employed. It is appreciated that other weighting functions and methods can be used, as desired or appropriate. The Huber weighting function is preferably used to reduce the impact of outlier data points on the model. The Iterative Reweighted Least Squares method is preferably used to achieve a good convergence of the model with the raw pattern. The Iterative Reweighted Least Squares method has been found to work well on substrate based data, although other methods could also be used.

Figure 2:
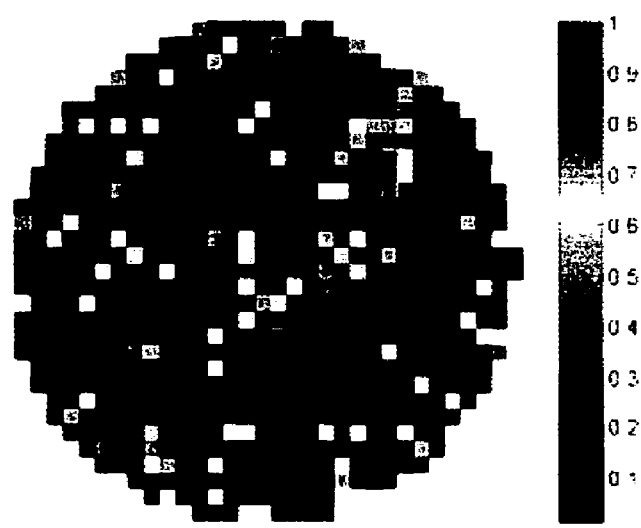
FIG. 2 depicts a visual representation of a mathematical weighting of substrate map data.

FIG. 2 depicts a map of the weights by location on the substrate as applied by the weighting function, which in the preferred embodiments is a Huber weighting function. As depicted in FIG. 2, the color scale represents the weight that a given data point will have in the model. Outlier data points are preferably given a low weight.

The process steps as described above are preferably iterated, which different patterns being selected, weighted, and combined, until the combined and weighted patterns approximate the raw substrate map as depicted in FIG. 1 to a desired degree. If a map of a given weighted combination does not match the raw substrate map to the desired degree, then another iteration is performed. Most preferably, this process is all accomplished on a computer that is programmed to do the selecting and matching based on pattern recognition technology. However, in alternate embodiments, the method can be performed manually.

FIG. 5 depicts a component substrate map that is the result of the iterations described above. FIG. 6 depicts the residuals of a comparison of the component model map to the original raw substrate map. In the example as depicted in FIG. 6, the component map matches the raw substrate map quite well, with an r2 value of about eighty percent. It is appreciated that the iterations described above can be continued until a better correlation or goodness of fit is found between the actual map and the model map, or stopper before the correlation is this good. It is further appreciated that other methods that measure goodness of fit could also be used. In the example as depicted, the exposure field tends to have a significant effect on the Iddq values. In addition, there is a significant crescent pattern occurring in the lower right portion of the substrate. With these underlying patterns removed, the weighting function data depicted in FIG. 2 and residuals data depicted in FIG. 6 show a significant number of randomly distributed points that represent readings that did not follow the systematic patterns.

After the model results are completed, the user preferably examines the resulting component patterns for accuracy. If the match is adequate, as described above, then the user preferably uses the data for further analysis of the fabrication process, as desired. In the example above, the user may want to investigate the source of the cross field problem. This could be done in one embodiment by rerunning this same analysis using maps that are generated only from substrates that were run on certain lithographic systems, and comparing the results from the individual systems to determine which lithography tool is the source of the pattern.

If the match is not adequate, the model is preferably rerun with a different set of component patterns. In the example above, the user my be interested in including an edge ring component, as some indication of such is evident in the residuals map.

Calculate Limits for the Weighting/Residual Data

After the model weighting values of FIG. 2 and the residuals data of FIG. 6 are generated, traditional statistics can be applied to the distribution of these values, to decide which values represent the outliers. For the weighting function data of FIG. 2, the limit is preferably set at the low side of the distribution, to determine which points are significantly de-rated to represent the outlier points. For the residuals data of FIG. 6, high values represent outliers, and the limit is preferably set at the high side. Either or both of these limits can be set to determine the outlier values. Various limit calculation techniques can be used in the calculations, including mean+/−sigma or median+/−IQR.

FIG. 2 shows a map of the weighted data to which limits would be applied to identify outliers. In this map, the points around the edges tend to represent very low weighting factors.

Bin Outlier Readings

Once the outlier values are identified by comparing their value to the limit or limits determined above, the corresponding elements of the substrate can be binned to a failing bin as a potential quality risk.

The present invention has many aspects which define over the prior art. The system according to the preferred embodiments of the present invention identifies outlier parametric data from the neighborhood of values surrounding it by mathematically separating the systematic variation components from the data, and evaluating the residuals data of the model fit. Outlier parametric data in the current methods can also be distinguished from the neighborhood of values surrounding it by mathematically separating the systematic variation components from the data and evaluating the de-weighting data of the model fit. A computer data system is preferably used for performing the outlier identification. The method provides a model-based method for performing outlier detection, that can be automated in a computer database system. Huber weighting and Iterative re-weighted Least Squares methods are preferably used for modeling substrate patterns, to highlight outlier data values.

The preferred embodiments of the present invention provide improved ability to separate systematic and relatively smooth substrate patterns from the noise that is caused by random variations and defects. The information contained in the entire substrate dataset is therefore used to analyze a given value for outlier status, rather than just using a few neighboring values, as is done with Nearest Neighbor Residual analysis. In the example depicted, the method did not classify as outliers the values that formed the edge ring pattern. Although this ring pattern signifies an impending failure, it is identified using the other aspects of the method, rather than flagging these values as outliers.

Many different approaches to the weighting function and the modeling calculation described above can be employed. This disclosure includes one example that has been found to work well for semiconductor wafer based data. Many other functions could be used with similar results. This invention can be applied to other types of manufacturing where site-based data is available and outlier detection is desirable, such as flat panel display manufacturing. Additional component patterns of interest beyond those listed could also be used, or given different names. Other statistical methods than those described herein could be applied to the residuals or weighting function data, to calculate the limit for outlier detection.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for determining outlier data points in an ordered dataset of values measured from a substrate, where the outlier data points represent potential process anomalies on the substrate the method comprising the steps of:
   a) selecting a subset of dataset patterns from a set of mathematical dataset patterns,
   b) combining the subset of dataset patterns into a composite dataset,
   c) comparing the composite dataset to the ordered dataset of values,
   d) determining a degree of correlation between the composite dataset and the ordered dataset of values,
   e) selectively weighting data points within the composite dataset to improve the degree of correlation,
   f) selectively iteratively repeating steps a through e until the degree of correlation is at least a desired value,
   g) selectively determining residuals for the data points within the composite dataset,
   h) selectively outputting as outlier data points at least one of (1) the weighted data points within the composite dataset that are weighted within a first specified range, and (2) data points within the composite dataset that have a residual within a second specified range, and
   i) analyzing the outlier data points for process anomalies.

2. The method of claim 1, wherein the composite dataset and the ordered dataset of values are presented as substrate maps.

3. The method of claim 1, wherein the ordered dataset of values comprises measured values from a substrate.

4. The method of claim 1, wherein the ordered dataset of values comprises parametric data from integrated circuits on a wafer.

5. The method of claim 1, wherein the set of mathematical dataset patterns includes at least one of cross exposure field, radial dependency, donut edge ring, center spot, right to left gradient, top to bottom gradient angled top to bottom gradient, and angled bottom to top gradient.

6. The method of claim 1, wherein the comparison between the composite dataset and the ordered dataset of values is a manual visual comparison.

7. The method of claim 1, wherein the comparison between the composite dataset and the ordered dataset of values is a mathematical comparison.

8. The method of claim 1, wherein the comparison between the composite dataset and the ordered dataset of values is an automated comparison.

9. The method of claim 1, wherein the ordered dataset of values is gathered from at least one of a flat panel display, a solar cell array, and a charge coupled device array.

10. The method of claim 1, wherein the ordered dataset of values includes x-y coordinates of values on a substrate.

11. The method of claim 1, wherein the outlier data points are the weighted data points within the composite dataset that are given a weight that is less than a specified value.

12. The method of claim 1, wherein the outlier data points are the data points within the composite dataset that have a residual that is greater than a specified value.

13. The method of claim 1, wherein the data points within the composite dataset are selectively weighted with a Huber weighting function.

14. The method of claim 1, wherein an Iterative Reweighted Least Squares method is performed until the degree of correlation is at least a desired value.

15. A method of determining outlier data points in an ordered set of data points measured from a substrate, where the outlier data points represent potential process anomalies on the substrate the method comprising the steps of: mathematically modeling data trends within the ordered set of data points, combining the mathematically modeled data trends in a composite dataset, computing residual values between the composite dataset and the ordered set of data points, flagging as outlier data points those data points in the ordered set of data points having a residual value greater than a desired maximum residual value, and analyzing the outlier data points for process anomalies.

16. The method of claim 15, wherein the ordered set of data points comprises measured values from a substrate presented as a substrate maps.

17. The method of claim 15, wherein the ordered set of data points is gathered from at least one of integrated circuits from a wafer, a flat panel display, a solar cell array, and a charge coupled device array.

18. A method of determining outlier data points in an ordered set of data points measured from a substrate, where the outlier data points represent potential process anomalies on the substrate, the method comprising the steps of: mathematically modeling data trends within the ordered set of data points, combining the mathematically modeled data trends in a composite dataset, adjusting a weighting of data points within the composite dataset until the composite dataset and the ordered set of data points have at least a desired degree of correlation, flagging as outlier data points those data points in the composite dataset having a weighting that is adjusted more than a desired maximum amount, and analyzing the outlier data points for process anomalies.

19. The method of claim 18, wherein the ordered set of data points comprises measured values from a substrate presented as a substrate map.

20. The method of claim 18, wherein the ordered set of data points is gathered from at least one of integrated circuits from a wafer, a flat panel display, a solar cell array, and a charge coupled device array.

* * * * *